June 9, 1953     I. HARTER, JR     2,641,034
METHOD OF AND APPARATUS FOR INDICATING
AND/OR CONTROLLING THE LEVEL OF LIQUID
WITHIN AN OPAQUE CONTAINER Filed Jan. 29, 1949     3 Sheets-Sheet 1

INVENTOR
Isaac Harter, Jr.
BY
ATTORNEY

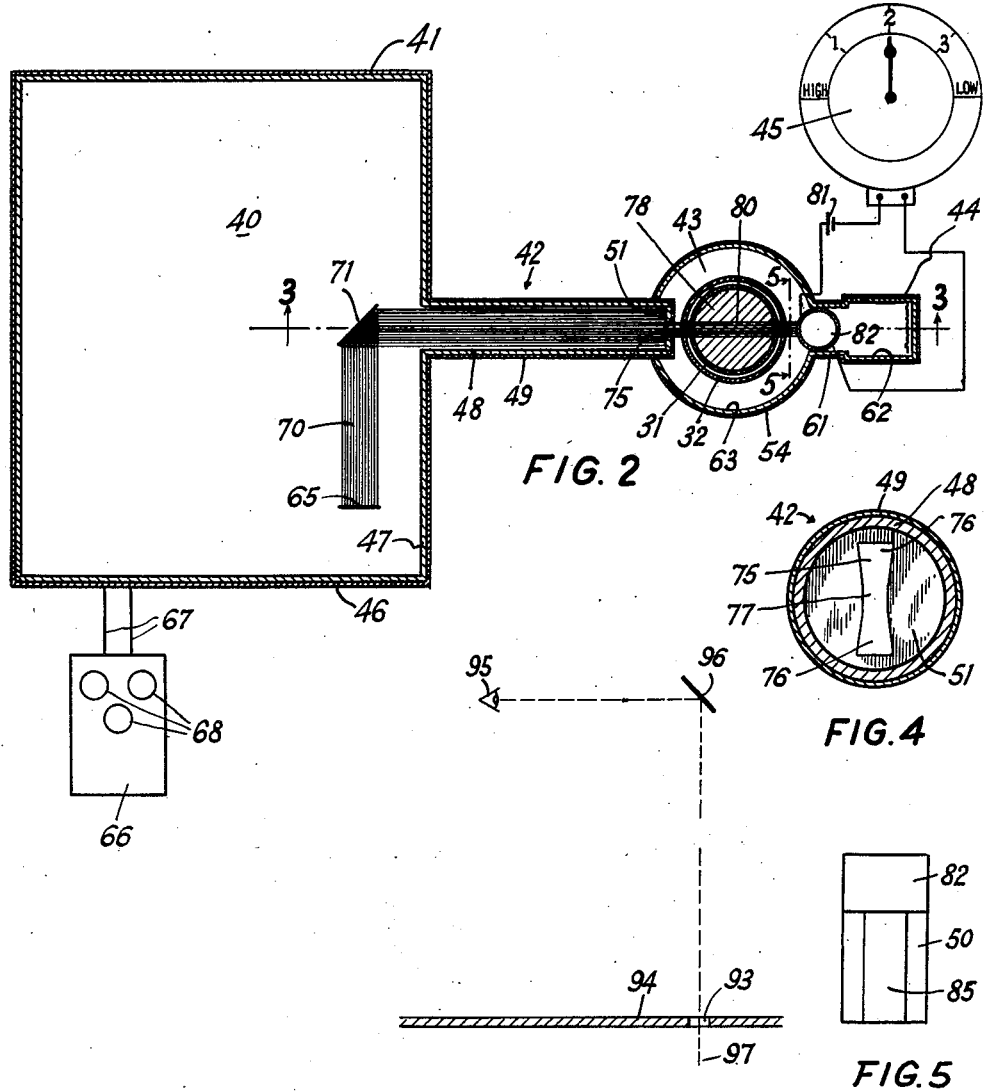
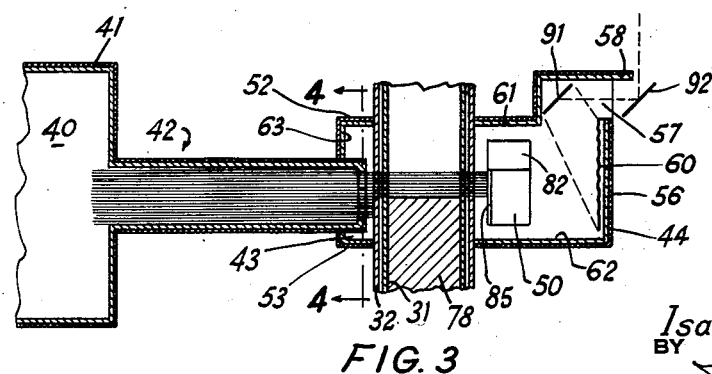

June 9, 1953     I. HARTER, JR     2,641,034
METHOD OF AND APPARATUS FOR INDICATING
AND/OR CONTROLLING THE LEVEL OF LIQUID
WITHIN AN OPAQUE CONTAINER
Filed Jan. 29, 1949     3 Sheets-Sheet 3

INVENTOR
Isaac Harter, Jr.
BY
J.P. Moran
ATTORNEY

Patented June 9, 1953

2,641,034

UNITED STATES PATENT OFFICE 2,641,034

METHOD OF AND APPARATUS FOR INDICATING AND/OR CONTROLLING THE LEVEL OF LIQUID WITHIN AN OPAQUE CONTAINER

Isaac Harter, Jr., Beaver, Pa., assignor, by mesne assignments, to The Babcock & Wilcox Company, Jersey City, N. J., a corporation of New Jersey Application January 29, 1949, Serial No. 73,643

2 Claims. (Cl. 22—57.2)

This invention relates to indicators and controls, and more particularly to an indicator and control for the level of liquid within an opaque container, including means providing a visible image of the liquid level within the opaque container.

The invention is particularly applicable to measurement and/or control of liquid level in high pressure liquid processing operations where strength requirements necessitate the use of very thick-walled, generally opaque pressure vessels. Such installations frequently require expensive and complicated arrangements to apprise an operator of the liquid level in the pressure vessel, particularly where a remote indication is desired.

In certain metal working operations, such as casting, for example, it is necessary or at least desirable to observe and/or control the level of molten metal within a container, such as a mold. Physical reasons require that a container for molten metal be made of a heat resistant substance, such as refractories, metal with a refractory lining, or temperature resistant metal. All of such materials are opaque, so that direct observation of the molten metal level is impossible. It is possible, of course, to observe the surface of the metal in an open mold, but such observation provides only an approximate indication of the level of the metal, and is difficult to practice due to the intense heat of the molten metal.

Various schemes have been proposed for indirectly indicating the level of a liquid within an opaque container. These schemes generally entail the moving of a source of penetrating radiant energy along the wall of the container, while moving an energy measuring means along the opposing wall, and are not satisfactory for many applications, particularly where automatic level control is desired.

In the continuous casting method for ferrous metals described in the copending application of I. Harter, et al., Serial No. 10,956, filed February 26, 1948, it is necessary, for best results, to maintain the molten metal in the mold at a predetermined level. For this purpose, the present invention includes a source of penetrating radiation, such as X-rays, means for directing an upwardly elongated beam of radiation therefrom through the mold at substantially the desired level, and an ionization chamber in the path of the beam. The penetrating effect of the radiation is so selected that the rays have sufficient penetrating power to pass through the empty mold and into the ionization chamber, but do not have sufficient penetrative power to pass through molten metal in the mold. The variations in conductivity of the chamber, due to variations in radiation received as a result of variations in the molten metal level cutting off more or less of the upward extent of the radiation beam, may be measured by an indicating meter to denote liquid level. Alternatively, such conductivity variations may be used to control the rate of withdrawing the casting from the mold. A feature of the invention is the use of a fluoroescent screen in the path of the beam, to picture the orifice of the ionization chamber and the molten metal level. A simple optical system enables an operator to view this screen and actually see the shadow image of the molten metal level.

As applied to liquid level indication and control, the invention apparatus is the same as used for molten metal level indication and control. The apparatus is used to direct an upwardly extending beam of X-rays through a thick walled, upwardly extending metal tube connected to the liquid holding apparatus in the same manner as an ordinary water gauge. The X-ray penetrating effect is so adjusted that the rays will penetrate through the tube metal and into the ionization chamber when the tube is empty. The presence of liquid in the tube cuts off more or less of the length of an upwardly extending beam of the X-rays entering the ionization chamber to vary the conductivity of the latter. A fluorescent screen behind the chamber, in combination with a simple optical system, permits observation of the liquid level. In certain instances, it is possible to direct the X-ray beam directly through the actual liquid container, particularly in the case of small diameter pressure vessels.

An object of the invention is, accordingly, to provide novel means for indicating and controlling the level of a liquid, in an opaque container or mold.

Another object is to provide a picturization of the liquid level, and a simple optical system for viewing such picturization.

A further object is to provide a simple indicator of the liquid level in an opaque container.

These and other objects, advantages and novel features of the invention will be apparent from the following description and the accompanying drawings.

In the drawings:

Fig. 2 is a horizontal sectional view on the line 2—2 of Fig. 1;

Fig. 3 is a vertical sectional view on the line 3—3 of Fig. 2;

Fig. 4 is a vertical sectional view on the line 4—4 of Fig. 3, illustrating the beam forming orifice for the X-ray beam;

Fig. 5 is an elevation view of the ray admitting orifice of the ionization chamber;

In order to provide an exemplary, but in no way limiting, illustration of the application of the invention principles to observation and control of molten metal level in a mold, the level indicator and control will be described as applied to the continuous steel casting method and apparatus shown and described in the aforementioned copending application of I. Harter et al., and Fig. 1 of the accompanying drawing illustrates apparatus shown in Fig. 2 of such copending application.

Figure 1:
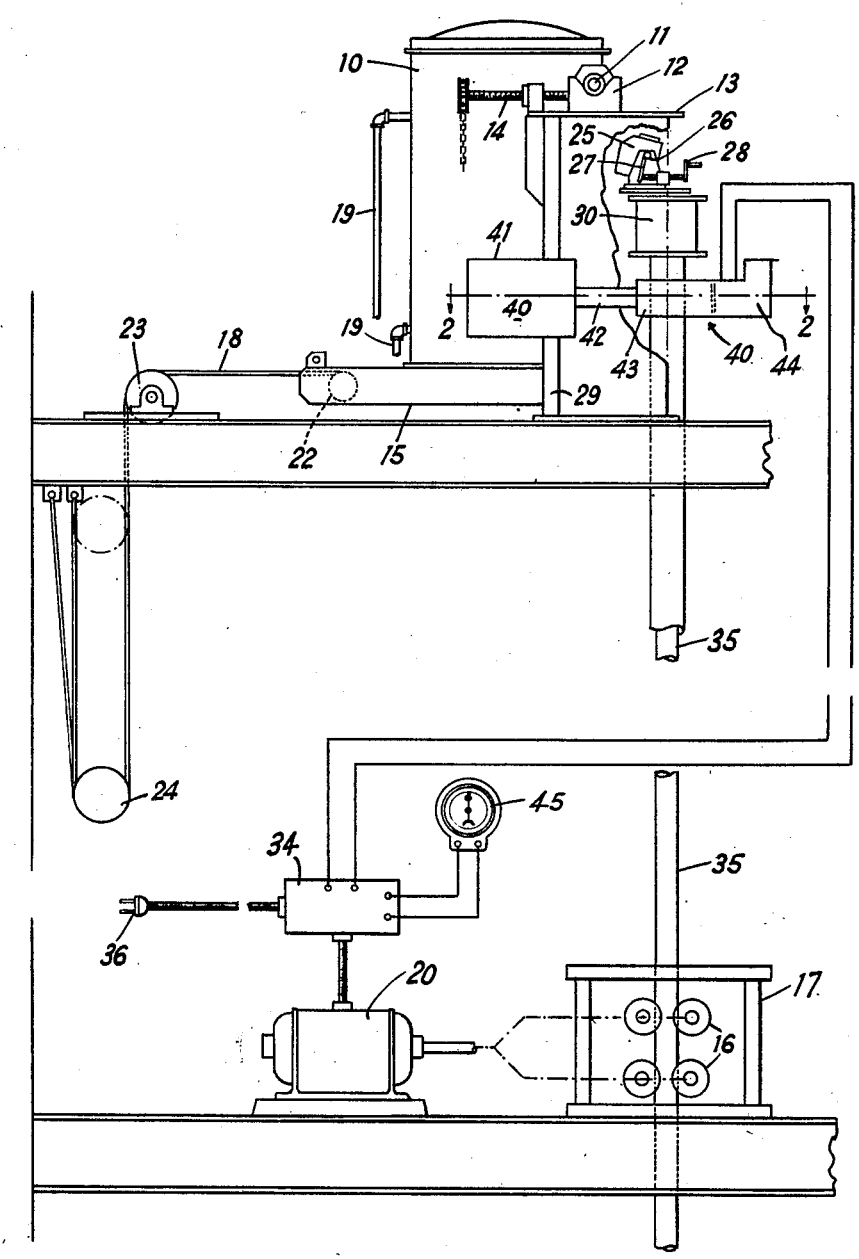
Fig. 1 is a partial side elevation of continuous metal casting apparatus having the invention molten metal level indicator and control incorporated therewith.

Referring to Fig. 1, in the continuous casting apparatus shown therein, molten steel or other ferrous metal or alloy is introduced at one end of the apparatus and semi-finished products, ready for shaping and finishing, are delivered from the opposite end. The molten metal is transported to the apparatus from a melting furnace (not shown) in any suitable manner, such as by a transfer ladle. The metal is poured from the transfer means into a suitable holding and pouring ladle 10 which is constructed and operated to maintain the molten metal held therein at a selected temperature. To maintain the selected temperature, the ladle 10 is heated by suitable means, for example, by induction heating.

The ladle 10 is arranged for pouring the molten metal, at a continuous and selected pour rate, into an adjustably positioned tun dish 25. For this purpose, ladle 10 is mounted on trunnions 11 engaged in trunnion bearings 12 on an L-shaped frame 15, and is provided with a suitable pouring lip above tun dish 25. The lateral position of bearings 12 is adjustable along guides 13 on pedestals 29 through operation of screws 14 which are driven by suitable means, such as geared motors (not shown).

As described in said copending application, tilting of frame 15 and ladle 10 is effected through a cable attached to a yoke on the frame, the cable being passed through conventional differential chain-blocks and wrapped around a grooved drum driven by a reversible motor. The electrical and cooling water connections to the ladle 10 are flexible to permit tilting of the ladle about trunnions 11. The flexible electrical cables 18 are attached to water-cooled pipes 19 leading to the induction heating coil. From pipes 19, cables 18 pass over a grooved drum 22 on frame 15 and over a grooved drum 23 on the supporting framework. The cables are then looped downwardly around a grooved drum 24, acting as a counterweight to maintain proper cable alignment, and to the electrical high frequency generator and control. Pipes 19 are provided with flexible connections (not shown) so that tilting of the ladle will not interfere with the flow of cooling water to the induction heating coil.

Tun dish 25 discharges the molten metal into the upper end of, and usually along the axial center of, an associated mold assembly 30, where the metal is rapidly chilled to form the shell or skin of an embryo casting. Solidification of the casting is completed in a subsequent delayed cooling and soaking section, from which it is withdrawn as a continuous casting 35 at a controlled rate by pinch rolls 16 mounted in a stand 17, all as described in said copending application. Pinch rolls 16 are schematically indicated as driven by a reversible motor 20. The tun dish 25 is removably mounted in open trunnion bearings 26 and, as shown in Fig. 1, has a depending arm 27 secured to one of the trunnions 26 and engaged by a screw crank 28. Adjustment of the vertical angle of tun dish 25 is effected by turning crank 28.

The motor 20 operates in response to the level indicator and control to vary the speed of rotation of pinch rolls 16 to control the position of solidified casting 35 in the mold assembly to maintain the molten metal at a predetermined level therein.

As shown in Fig. 1, the level indicator and control 40 includes a housing 41 enclosing a source of X-rays, a guide tube 42 connecting housing 41 to an annular chamber 43 surrounding the outer tube 32 of mold assembly 30, and an ionization chamber housing 44. The ionization chamber 50 in housing 44 is electrically connected to a control box 34 which is supplied with electric power from a suitable source 36. Control box 34 contains suitable electrical or electronic relays operable, responsive to the degree of ionization in chamber 50, to control motor 20 to maintain the molten level at a predetermined level in mold assembly 30, as will be described hereinafter. An indicating meter 45 may be connected to the control box 34 for visual observation, and a fluorescent screen and optical system may be used to provide an image of the molten metal level.

Referring more particularly to Figs. 2 and 3, the mold assembly 30 includes a molding tube or mold liner 31 concentric with and of less diameter than outer tube 32, and means are provided to pass cooling fluid between the two tubes 31 and 32 to cool tube 31 to chill the molten metal. The particular arrangements are fully shown and described in said aforementioned copending application, and are not described in detail herein except insofar as necessary to a clear understanding of the present invention.

The X-ray tube housing 41 comprises a steel casing 46 having a relatively thick lead lining 47 on its inner surface, and lining 47 is continuous with the thick lead lining 48 within the steel casing 49 of tube 42. The outer end of tube 42 enters chamber 43 and is closed by a circular lead plate 51 continuous with lining 48.

Annular chamber 43 surrounding mold assembly 30, is formed as a cylinder having top and bottom walls 52, 53 apertured to fit over mold assembly tube 32, and a side wall 54. Wall 54 is apertured to receive tube 42 and, opposite tube 42, wall 54 opens into housing 44. The latter comprises a substantially rectangular steel casing having side walls, a bottom wall, a top wall and an outer end wall 56. The end wall 56 has an opening 57 just beneath the top wall, and the top wall is extended, as at 58, beyond end wall 56. Housing 44 is connected to chamber 43 by a rectangular duct 61, and the walls of the housing and duct have a continuous, relatively thick, inner lead lining 62 continuous with the lead lining 63 on the inner surface of the walls of chamber 43.

An X-ray generator or tube is mounted in housing 41, with its cathode or generating plate being indicated at 65. The X-ray tube is controlled from a control panel 66, having conductors 67 extending into housing 41, and provided with meters 68. From cathode plate 65, a beam of X-rays 70 is directed against target plate 71 and into tube 42.

End plate 51 of tube 42 is formed with an upwardly elongated aperture 75, as shown more particularly in Fig. 4. This aperture includes upper and lower enlarged portions 76, 76 connected by an intermediate narrower portion 77. In effect, the aperture 75 has the shape of a pair of trapezoids whose shorter bases form a pair of opposite walls of a rectangle. Through the medium of aperture 75, an upwardly elongated beam 80 of X-rays is directed through mold tubes 31 and 32, and into ionization chamber 50 which is located at the intersection of chamber 43 and duct 61. The shape of aperture 75 is selected to obtain substantially uniform voltage increments and height increments on the indicator or recorder.

Ionization chamber 50 has an upwardly elongated aperture 85 diametrically aligned with aperture 75, and having a height of the same order as that of aperture 75, to receive beam 80, or any portion thereof, passing through the mold assembly 30. The X-rays entering the ionization chamber control the conductivity thereof, as is well known to those skilled in the art.

Through the medium of a source of potential 81 connected in series with meter 45, a potential is impressed on chamber 50 through transmitter 82, and meter 45 registers the current flow which is a function of the degree of ionization in chamber 50. The degree of ionization is, in turn, a function of the intensity of radiation entering aperture 85, and the intensity of radiation is a function of the molten metal level in liner 31. As this level rises or falls, it cuts off more or less of the extent of beam 80. Consequently, the effective radiation intensity of the beam 80 entering chamber 50 varies from normal in accordance with the amount of the beam 80 intercepted by the molten metal 78. Thus, meter 45, which measures the conductivity of chamber 50, indicates the relative level of the molten metal in tube liner 31.

In the arrangement of Fig. 1, the degree of ionization of chamber 50 affects the conductivity of the chamber, and the voltage across the chamber is used with a suitable electric and/or mechanical control arrangement, having antihunt characteristics, to govern the speed of motor 20. The latter is adjusted to operate at a predetermined speed when the ionization of chamber 50 is at the null point, that is, when the molten metal level is at the center of the operating range. An increase in voltage, due to a drop in metal level, effects a reduction in the speed of motor 10 to reduce the withdrawal rate of casting 35. Similarly, when the voltage decreases, due to a rise in the molten metal level, the speed of motor 50 is increased to increase the casting withdrawal rate. Such level variations are caused by variations in the pouring rate and/or in the casting withdrawal rate. The present control may also be used as a vernier control for the master ladle tipping control described and claimed in the copending application of T. W. Ratcliffe et al., Serial No. 107,506, filed July 29, 1949, for "Method of and Apparatus for Controlling the Rate of Pouring Fluid Material From One Container Into Another."

A feature of the invention is the arrangement for providing a remote image of the molten metal level in liner 31. This arrangement includes the fluorescent screen 60 mounted in housing 44 behind chamber 50 and adjacent end wall 56. The shadow image of aperture 85, or any portion thereof, produced on screen 60 is reflected by mirror 91 through opening 57 where it is redirected upwardly by mirror 92. The latter directs the light beam 97 through an opening 93 in the platform 94 of a control operator's housing which may be above the molding apparatus. A mirror 96 receives the projected image and may be observed by the operator as indicated by eye 95. The optical system may be varied in accordance with the location of the operator's station relative to the molding apparatus, a location thereabove being chosen for illustrative purposes only. The important consideration is the use of an indirect or redirected optical system so that X-rays emerging from opening 57 will not reach the operator. Such X-rays travel in a straight line when once directed as a beam, and do not "bounce" so severely from the surface of the liquid as to cause an uncontrollable factor.

Figure 6:
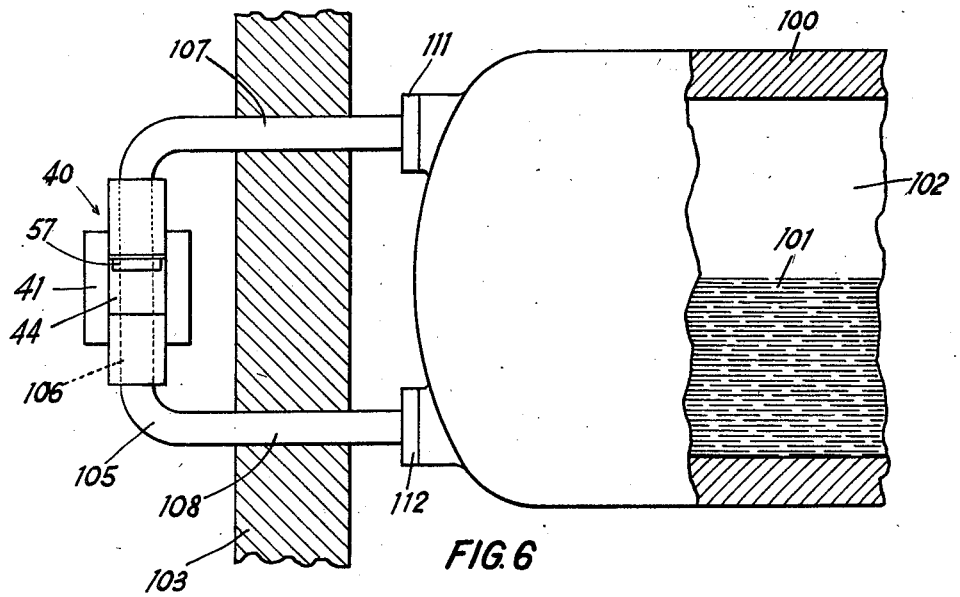
Fig. 6 is a partial vertical section of a vapor generator showing the liquid level indicator of the present invention incorporated therewith.
Figure 7:
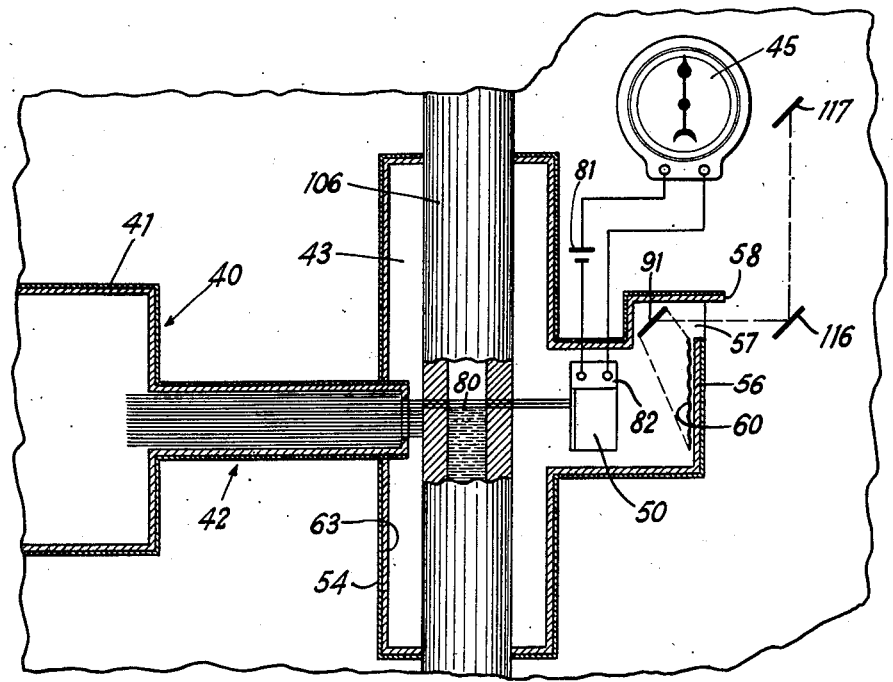
Fig. 7 is a front elevation of a portion of the vapor generator of Fig. 6, certain parts being shown in section.

Figs. 6 and 7 show the application of the liquid level indicator and control 40 to the indication and/or control of liquid level in a vapor generator, by way of exemplification of the use of the invention as a liquid level control and/or indicator. Specifically, the device 40 is illustrated as applied to the indication of the level of water 101 in the steam drum 100 of a vapor generator, the steam drum being adapted to contain both water and steam. In accordance with the present practice in which steam is generated at high pressures and temperatures, drum 100 is a thick walled metal shell, the wall thickness of which is sufficient to withstand the high pressures of the steam contained therein.

For exemplary purposes only, drum 100 is illustrated as mounted immediately behind a front wall 103 of a steam generator, and may be supported in any suitable manner well known to those skilled in the art. In accordance with the invention, there is provided a thick walled small diameter metal tube 105 having an upwardly extending run 106 continuing into lateral runs 107, 108 which extend through wall 103 and are suitably united to drum 100, as at 111 and 112, so that runs 107 and 108 are in communication with the upper and lower sections of drum 100. Consequently, the level of the water in upward run 106 will be substantially the same as the water level in drum 100.

Device 40 is associated with run 106 in substantially the same manner as it is associated with the mold assembly 30 in the embodiment previously described. Chamber 43 fits around section 106, and preferably is vertically extended to cover substantially the full length of section 106.

The intensity of the X-rays is so adjusted that the beam passing through aperture 75 of tube 42 is of sufficient strength to pass through the walls of tubing 105 when the latter is empty, and to enter ionization chamber 50. However, when the water in tube 105 is in the path of the X-ray beam 80, it cuts off this beam in proportion to the water level in tubing 105, as the strength of the X-ray beam is not sufficient to penetrate through the water column in addition to penetrating through the walls of tubing 105. Consequently, the amount of radiation entering chamber 50 is varied in accordance with the level of water in tube 105 adjacent the apertures 75 and 85. As explained, this varies the ionization and thus the conductivity of chamber 50. The conductivity may be measured by meter 45 to remotely indicate the water level, or may be applied, as in the previous example, to control arrangements such as motor or solenoid valves, or the like, to maintain the water level in drum 100 at a predetermined value.

Preferably, means are arranged to provide an image of aperture 75, and of the water level thereat by the plant operator. Thus, the image of aperture 75, or of any portion thereof dependent upon the water level in tube 105, is formed on fluorescent screen 60, and this image is reflected by the mirror 91 through aperture 57 of housing 44. A simple optical system comprising mirrors 91 and 116 may be utilized to direct the image on screen 60 onto mirror 117, wherein the image may be readily observed by an operator standing on the floor or in a control booth. Thus, a simple and reliable indication and control system for liquid level in high pressure apparatus is provided.

The described arrangement provides a simple and effective indication and control system for the level of liquid with an opaque holder, such as a metal liquid level gauge or a mold. While described particularly as applied to a continuous casting mold and to a water level indicator, the system is applicable to any type process in which the level of molten metal or other liquid is to be indicated and/or controlled. The provision of the fluorescent screen and associated optical system enables visual observation to be made of the image of the liquid level within its container.

While a specific embodiment of the invention has been shown and described in detail to illustrate the application of the principles thereof, it will be understood that the invention may be embodied otherwise without departing from such principles.

What I claim:

1. Apparatus for determining the level of liquid within an opaque container, comprising, in combination, a lead-lined casing surrounding said container at substantially the desired level of the liquid therein; a lead-lined housing; a source of penetrating radiation in said housing; a lead-lined tube interconnecting said housing and casing and having an aperture in its casing end, elongated in the direction of change of liquid level, for directing a beam of penetrating radiation having a cross-sectional area, elongated in the direction of change of liquid level, through said container, whereby the liquid will intercept more or less of the length of the upwardly extended cross-sectional area of the beam in accordance with the liquid level; said source and said tube being at substantially the same level as said casing; an ionization chamber aligned with said tube on the opposite side of the container and within said casing to receive said beam; means operative to impress an electric potential on said ionization chamber; and indicator means operative to measure the conductivity of said chamber as a function of the radiation of the non-intercepted length of the cross-sectional area of said beam entering said chamber, the remaining portion of the length of the cross-sectional area of said beam being intercepted by the liquid in said container.

2. In continuous metal casting apparatus in which molten metal is introduced into the upper end of an open-ended mold and electrically controlled mechanism withdraws solidified metal from the lower end of said mold, apparatus for controlling the level of molten metal with the mold, comprising, in combination, a lead-lined casing closely embracing the mold at substantially the desired level of molten metal therein; a source of penetrating radiation; means, including a lead-lined tube interconnecting said source and said casing and having an aperture, elongated lengthwise of the mold, in its end adjacent the mold at substantially the desired level of the molten metal therein, operative to direct a beam of radiation, having a cross-sectional area, elongated lengthwise of the mold, from said source through said mold, whereby the molten metal will intercept more or less of the length of the extended cross-sectional area of the beam in accordance with the molten metal level; said source and said tube being at substantially the same level as said casing; an ionization chamber communicating with said casing in alignment with said tube arranged to receive said beam; means operative to impress an electric potential on said ionization chamber; and electric control means, responsive to the electrical conductivity of said chamber as a function of the radiation of the non-intercepted portion of the beam entering said chamber, controlling the operation of said mechanism to control the casting withdrawal rate to control the molten metal level within the mold.

ISAAC HARTER, Jr.

References Cited in the file of this patent

UNITED STATES PATENTS

| Number | Name | Date |
|---|---|---|
| 2,277,756 | Hare | Mar. 31, 1942 |
| 2,298,942 | Hicks et al. | Oct. 13, 1942 |
| 2,323,128 | Hare | June 29, 1943 |
| 2,456,233 | Wolf | Dec. 14, 1948 |